(12) United States Patent
Takakura

(10) Patent No.: US 9,676,161 B2
(45) Date of Patent: Jun. 13, 2017

(54) AEROPLANE CRUSHING DEVICE, AND AEROPLANE DEMOLITION METHOD

(71) Applicant: KABUSHIKI KAISHA TOWANI, Toyama-shi, Toyama (JP)

(72) Inventor: Yoshiaki Takakura, Toyama (JP)

(73) Assignee: KABUSHIKI KAISHA TOWANI, Toyama (JP)

( * ) Notice: Subject to any disclaimer, the term of this patent is extended or adjusted under 35 U.S.C. 154(b) by 0 days.

(21) Appl. No.: 15/253,137

(22) Filed: Aug. 31, 2016

(65) Prior Publication Data
US 2016/0368234 A1 Dec. 22, 2016

Related U.S. Application Data

(62) Division of application No. 14/728,498, filed on Jun. 2, 2015, now Pat. No. 9,452,582, which is a division
(Continued)

(30) Foreign Application Priority Data

Nov. 5, 2012 (JP) ................................ 2012-243750

(51) Int. Cl.
*B30B 9/32* (2006.01)
*B30B 15/30* (2006.01)
(Continued)

(52) U.S. Cl.
CPC .................. *B30B 9/32* (2013.01); *B09B 3/00* (2013.01); *B09B 5/00* (2013.01); *B30B 7/04* (2013.01);
(Continued)

(58) Field of Classification Search
CPC .. B30B 9/32; B30B 9/326; B30B 9/00; B30B 7/04; B30B 3/00; B30B 15/0023;
(Continued)

(56) References Cited

U.S. PATENT DOCUMENTS 3,005,403 A * 10/1961 Van Endert ............... B30B 7/04
100/141
3,101,044 A 8/1963 Schlidt et al.
(Continued)

FOREIGN PATENT DOCUMENTS

EP 2177270 A1 4/2010
JP 62092098 U 6/1987
(Continued)

OTHER PUBLICATIONS

Chinese Office Action (and English translation thereof) dated May 18, 2016, issued in counterpart Chinese Application No. 201380007110.4.
(Continued)

*Primary Examiner* — Jimmy T Nguyen
(74) *Attorney, Agent, or Firm* — Holtz, Holtz & Volek PC

(57) ABSTRACT

An aircraft collapsing device that collapses a fuselage of an aircraft inward, the system includes a gate-shaped shell formed to cover a circumference of both sides and an upper portion of a fuselage of an aircraft body from which horizontal wings and a vertical wing have been decoupled; a wedge-shaped pressing member that is mounted on an upper portion of the shell to press at least one portion of a circumference of at least one of annular frames juxtaposed in a longitudinal direction of the fuselage toward a center of the fuselage; a pair of sidewall pressing members that is mounted on both sides of the shell to press the fuselage simultaneously from two directions crossing a pressing direction of the wedge-shaped pressing member at the center of the fuselage after pressing by the wedge-shaped pressing member; and a moving unit that moves the fuselage of the aircraft and the shell relative to one another, wherein each of the pair of sidewall pressing members includes a plate-shaped pressing plate, and a projection member extends in
(Continued)

a longitudinal direction of the fuselage and is formed on the pressing surface side of the plate-shaped pressing plate.

20 Claims, 7 Drawing Sheets

Related U.S. Application Data of application No. 14/368,486, filed as application No. PCT/JP2013/073659 on Sep. 3, 2013, now Pat. No. 9,138,955.

(51) Int. Cl.
| | |
|---|---|
| *B30B 7/04* | (2006.01) |
| *B30B 15/06* | (2006.01) |
| *B09B 3/00* | (2006.01) |
| *B64F 5/00* | (2017.01) |
| *B09B 5/00* | (2006.01) |
| *B30B 9/00* | (2006.01) |
| *B30B 15/00* | (2006.01) |
| *B30B 13/00* | (2006.01) |

(52) U.S. Cl.
CPC ............... *B30B 9/00* (2013.01); *B30B 13/00* (2013.01); *B30B 15/0023* (2013.01); *B30B 15/062* (2013.01); *B30B 15/30* (2013.01); *B64F 5/00* (2013.01); *Y02P 70/585* (2015.11)

(58) Field of Classification Search
CPC ....... B30B 13/00; B30B 15/30; B30B 15/062; B09B 5/00; B64F 5/00; Y02T 50/90; B23D 15/00
USPC .. 100/42, 94, 95, 96, 98 R, 229 R, 232, 901
See application file for complete search history.

(56) References Cited

U.S. PATENT DOCUMENTS

| | | | |
|---|---|---|---|
| 3,170,389 A | 2/1965 | Parks et al. | |
| 3,339,905 A | 9/1967 | Tezuka et al. | |
| 3,371,599 A | 3/1968 | Tezuka | |
| 3,695,174 A * | 10/1972 | Tezuka | ................... B30B 9/326 |
| | | | 100/139 |
| 3,965,812 A | 6/1976 | Oberg et al. | |
| 4,086,850 A | 5/1978 | Becker et al. | |
| 4,094,240 A | 6/1978 | Suzuki et al. | |
| 4,369,700 A | 1/1983 | Flagg et al. | |
| 4,909,141 A | 3/1990 | Blenski et al. | |
| 9,138,955 B2 * | 9/2015 | Takakura | ................. B09B 3/00 |
| 9,452,582 B2 * | 9/2016 | Takakura | ................. B09B 3/00 |
| 2011/0000991 A1 | 1/2011 | Takakura | |

FOREIGN PATENT DOCUMENTS

| | | |
|---|---|---|
| JP | 10296496 A | 11/1998 |
| JP | 2003034826 A | 2/2003 |
| JP | 2007168969 A | 7/2007 |
| JP | 2010064174 A | 3/2010 |
| JP | 2011063233 A | 3/2011 |
| JP | 2013059848 A | 4/2013 |

OTHER PUBLICATIONS

Communication under Rule 71(3) dated Jun. 15, 2016, issued by the European Patent Office in counterpart European Application No. 13851608.3.

Extended European Search Report dated Jul. 3, 2015, issued in counterpart European Application No. 13851608.3.

International Search Report (ISR) dated Dec. 10, 2013 issued in International Application No. PCT/JP2013/073659.

* cited by examiner

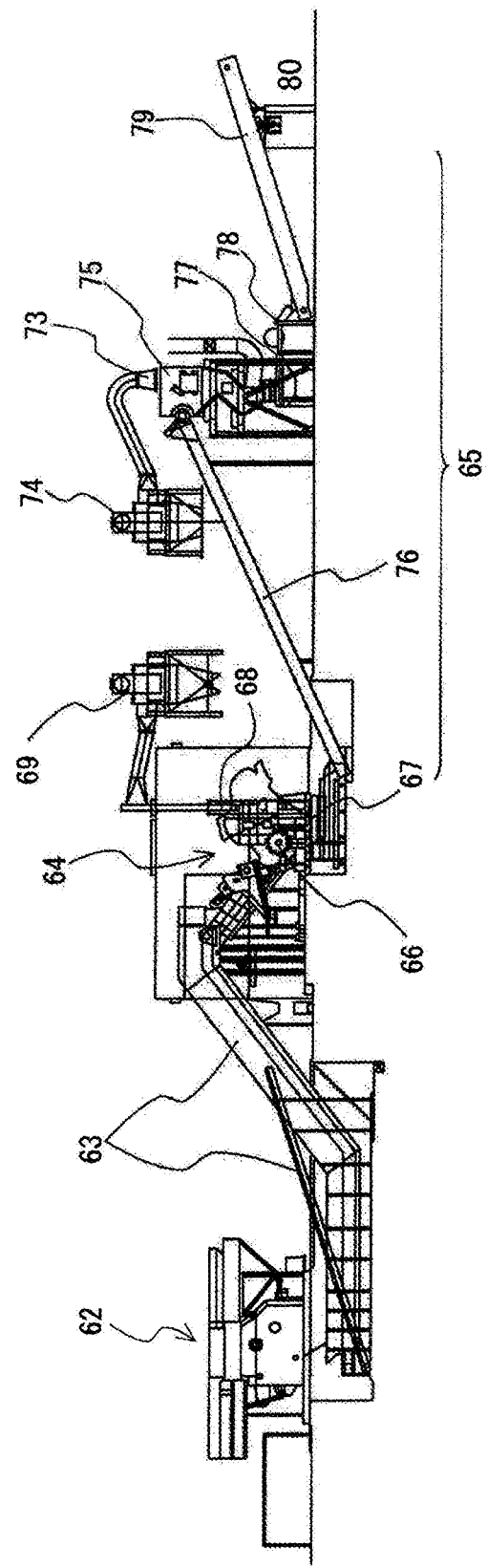

AEROPLANE CRUSHING DEVICE, AND AEROPLANE DEMOLITION METHOD

CROSS REFERENCE TO RELATED APPLICATIONS

This is a Divisional of U.S. application Ser. No. 14/728,498, filed Jun. 2, 2015, which is a Divisional of U.S. application Ser. No. 14/368,486 (now U.S. Pat. No. 9,138,955), filed Jun. 24, 2014, which is based upon and claims the benefit of priority from prior Japanese Patent Application No. 2012-243750, filed Nov. 5, 2012, the entire contents of all of which are incorporated herein by reference.

TECHNICAL FIELD

The present invention relates to an aircraft collapsing device and an aircraft dismantling method to allow aircrafts to be reusable as effective resources and to be dismantled rapidly.

BACKGROUND ART

The present inventors have proposed a scrap processing yard to dismantle wastes such as automobiles and to sort and collect each type of material (see Patent Document 1). In this scrap processing yard, a series of steps including carrying-in, dismantling, cutting, and sorting discarded automobiles is performed.

The long vehicles such as passenger traffic cars including passenger cars, trains, and diesel cars and buses are also discarded in the scrap processing yard to sort and collect each type of material for reuse of resources. For example, when passenger traffic cars such as passenger cars, trains, and diesel cars are discarded, a chassis rotatably supporting wheels and a car body secured to the chassis are separated from one another, and the body is dismantled, cut, and sorted on the scrap processing yard. However, this is not efficient.

Specifically, the inner surface of two sidewalls and a ceiling of a passenger traffic car body are decorated by painting and by interior components such as cloth. Scrap processing yards for automobiles are assumed to dismantle relatively small dismantlement targets such as automobiles. So, to dismantle long dismantlement targets including passenger traffic cars such as passenger cars, trains, and diesel cars, vehicles such as buses, and tanks, in which glass components, interior components, etc. are mounted, six operators and approximately one week may be required and further improvement of the operating efficiency is difficult in existing facilities.

Then, the present inventors have proposed a passenger traffic car dismantlement method and a dismantlement system (see Patent Document 2). In this method and system, a passenger traffic car is rotated about the longitudinal axis so that its inner walls to which mounting components have been mounted are work planes, the mounting components are separated from the work planes of the object to be dismantled and are discharged, the passenger traffic car from which the mounting components have been separated is pressed and cut, and a waste mass of a predetermined size is formed.

On the other hand, dismantlement facilities specific for aircrafts are absent in this country. Aircrafts such as passenger planes are said to have no limited useful life when proper maintenance is carried out. Commercial aircrafts are said to be discarded after twenty to thirty years in advanced nations and after fifty years in developing nations using secondhand aircrafts of advanced nations.

RELATED ART

Patent Documents

Patent Document 1: JP-A No. 2007-168969
Patent Document 2: JP-A No. 2011-63233

SUMMARY OF THE INVENTION

Problem to be Solved by the Invention

Current aircrafts have high percentage of composite material such as carbon fiber reinforced plastic (CERP). It is known that old aircrafts have very high percentage of aluminum, which are light and strong, and duralumin, which is an alloy of aluminum. Therefore, in this country, having few natural resources, it is necessary to highly use discarded aircrafts particularly as effective resources.

An object of the present invention is to obtain an aircraft collapsing device and an aircraft dismantling method to reuse aircrafts as effective resources and to rapidly dismantle aircrafts.

Means for Solving the Problem

An aircraft collapsing device according to a first aspect of the invention collapses a fuselage of an aircraft inward, and includes:

a gate-shaped shell formed to cover a circumference of both sides and upper portion of a fuselage of an aircraft body from which horizontal wings and a vertical wing have been separated;

a wedge-shaped pressing member that is mounted to an upper portion of the shell to press at least one portion of a circumference of at least one of annular frames juxtaposed in a longitudinal direction of the fuselage toward a center of the fuselage;

a pair of sidewall pressing members that is mounted to both sides of the shell to press the fuselage simultaneously from two directions crossing a pressing direction of the wedge-shaped pressing member at a central position of the fuselage after pressing by the wedge-shaped pressing member; and a moving unit that moves the fuselage of the aircraft and the shell relatively.

In the aircraft collapsing device according to a second aspect of the invention, the moving unit of the first aspect moves the circumferential surface of the fuselage from one longitudinal end on the tail side to the other end on the cockpit side.

In the aircraft collapsing device according to a third aspect of the invention, when the wedge-shaped pressing member of the first or second aspects abuts each of the juxtaposed annular frames of the fuselage, the wedge-shaped pressing member presses each frame substantially equally.

In the aircraft collapsing device according to a fourth aspect of the invention, the wedge-shaped pressing member of any one of the first to third aspects presses the fuselage obliquely to the circumferential direction of the annular frames of the fuselage.

In the aircraft collapsing device according a fifth aspect of the invention, auxiliary pressing members that are capable of preventing a buildup of the fuselage when the wedge-shaped pressing member presses the fuselage are provided to both sides of the wedge-shaped pressing member of any one of the first to fourth aspects.

An aircraft dismantling method according to a sixth aspect of the invention is a method of dismantling aircrafts, and includes:

a cutting-off step of separating horizontal wings and a vertical wing from a fuselage of an aircraft body;

a collapsing step of sequentially collapsing a circumferential surface of the fuselage from which the wings have been separated from one longitudinal end to the other end; and a cutting step of cutting a collapsed object compressed in the collapsing step by a certain longitudinal length to form waste masses, the collapsing including:

a first collapsing step to press at least one portion of the circumference of at least one of annular frames juxtaposed in the longitudinal direction of the fuselage by use of a wedge-shaped pressing member; and a second collapsing step to press the fuselage simultaneously from two directions crossing the pressing direction of the wedge-shaped pressing member at the central position of the fuselage after the first collapsing step, wherein auxiliary pressing members that are capable of preventing a buildup of the fuselage when the wedge-shaped pressing member presses the fuselage are provided to both sides of the wedge-shaped pressing member.

In an aircraft dismantling method according to a seventh aspect of the present invention, the collapsing step is to sequentially collapse the circumferential surface of the fuselage from the longitudinal one end on the tail side to the other end on the cockpit side.

Advantageous Effect of the Invention

The present invention has an advantageous effect that aircrafts are made reusable as effective resources and a dismantling device and a dismantling method for rapid dismantlement are obtainable.

BRIEF DESCRIPTION OF THE DRAWINGS

FIG. 8 is a cross sectional view taken along A-A of FIG. 7.

DETAILED DESCRIPTION OF THE PREFERRED EMBODIMENT

Figure 1:
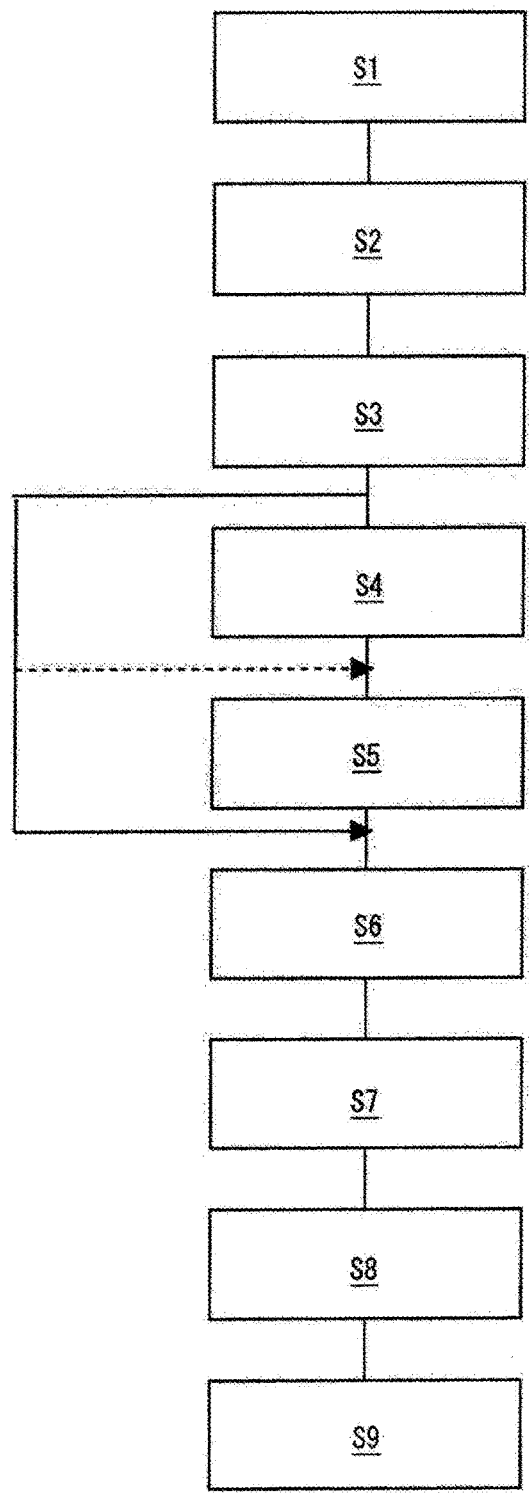
FIG. 1 is a flowchart of one example of the present invention to show an aircraft dismantling step of the present invention.

An aircraft collapsing device of the invention collapses a fuselage of an aircraft inward, and includes: a gate-shaped shell formed to cover the circumference of both sides and upper portion of a fuselage of an aircraft body from which horizontal wings and a vertical wing have been separated; a wedge-shaped pressing member that is mounted to an upper portion of the shell to press at least one portion of the circumference of at least one of annular frames juxtaposed in the longitudinal direction of the fuselage toward the center of the fuselage; a pair of sidewall pressing members that is mounted to both sides of the shell to press the fuselage simultaneously from two directions crossing the pressing direction of the wedge-shaped pressing member at the center of the fuselage after the pressing by the wedge-shaped pressing member; and moving means that moves the fuselage of the aircraft and the shell relatively. Thus, aircrafts are allowed to be reused as effective resources and dismantled rapidly.

More specifically, the structure of the fuselage of an aircraft provides a space for crews and passengers, baggage of passengers, and freight and has a semi-monocoque structure (partially a monocoque structure) in many cases. Specifically, the structure has annular frames juxtaposed in the longitudinal direction of the fuselage to form the cross section of the cylinder of the fuselage, stringers coupling the annular frames to each other, and a skin to couple the annular frames and stringers externally.

The annular frames are primary structure members having cross section shapes of the fuselage. Frames of Z-shaped cross sections are arranged to the fuselage of, e.g., the Boeing 747 at an internal of twenty inches (=50.8 cm). The cross sections of stringers are L-shaped, J-shaped, Z-shaped, hat-shaped (cross section of a hat with a brim), etc. Z-shaped or hat-shaped stringers are installed to the fuselage of the Boeing 747 circumferentially at an interval of eight inches (=20.32 cm). Stringers and a skin are usually combined using many rivets.

In a transport aircraft in which the cabin is pressurized, pressure bulkheads are attached to the front and rear of the fuselage of the semi-monocoque structure. The front pressure bulkhead is placed behind a weather radar in the nose, plate shaped, and smaller than the rear bulkhead. The rear pressure bulkhead in the backmost in the cabin is large. For example, in the Boeing 747, the rear pressure bulkhead has a shape of a bowl opened to the cabin. In the DC-10 and Boeing 727, the rear pressure bulkhead uses the same flat type as the front one.

In such a semi-monocoque structure, the strength of the frames in particular is high. Therefore, to form a waste mass, it is necessary to deform or cut the frames. To achieve this, a gate-shaped shell formed to cover the circumference of both sides and upper portion of a fuselage of an aircraft body from which horizontal wings and a vertical wing have been separated; a wedge-shaped pressing member that is mounted to an upper portion of the shell to press at least one portion of the circumference of at least one of annular frames juxtaposed in the longitudinal direction of the fuselage toward the center of the fuselage; a pair of sidewall pressing members that are mounted to both sides of the shell to press the fuselage simultaneously from two directions crossing the pressing direction of the wedge-shaped pressing member at the center of the fuselage after the pressing by the wedge-shaped pressing member; and moving means that moves the fuselage of the aircraft and the shell relatively are provided. The waste mass can be formed by efficiently collapsing the fuselage.

Particularly, the collapsing step to press the fuselage of the aircraft body toward the center of the fuselage includes: a first collapsing step to press at least one portion of the circumference of at least one of annular frames juxtaposed in the longitudinal direction of the fuselage; and a second collapsing step to simultaneously press the circumference of the fuselage from two directions crossing the pressing direction of the wedge-shaped pressing member at the center of the fuselage by use of a pair of sidewall pressing members after the first collapsing. The annular frames are deformed inward or cut by the collapsing by the wedge pressing member, and crushed and compressed by the subsequent collapsing by the pair of sidewall pressing members. As a result, the waste mass can be formed easier in the following cutting step.

That is, after the annular frames opposing the force from the direction perpendicular to the longitudinal axis of the fuselage of the aircraft are elastically deformed by the wedge pressing member, the annular frames are further collapsed by the pair of sidewall pressing members. As a result, even in the semi-monocoque structure having stringers and frames as a main structure as in the fuselage of the aircraft, the collapsing means having a small power is capable of performing the collapsing step with small resistance.

The "elastic deformation" in this case means that the deformation due to an applied force is not reversible even when no force is applied. For example, the elastic deformation corresponds to a cut state, including a state in which a pressed portion is distorted and a state in which a pressed portion cracks. Accordingly, the collapsing step is performable with smaller resistance and a smaller output than those when the elastic deformation is not made in advance.

In the first collapsing step to press at least one portion of the circumference of at least one of the annular frames juxtaposed in the longitudinal direction of the fuselage toward the center of the fuselage by use of the wedge pressing member, at least one portion of the circumference of the annular frame may be pressed by the wedge pressing member. For example, on downwardly pressing the fuselage from above toward the center, one place is pressed to achieve the collapsing. In addition, since fuselages of aircrafts have large diameters, the pressing from above may need a large device. That is, in the pressing from the sides, a pair of wedge-shaped pressing members is preferably placed oppositely, and may be driven simultaneously to press the fuselage from both sides toward the center.

In the collapsing step of the present invention, it is preferable that the circumference along the longitudinal direction of the fuselage is sequentially collapsed from one longitudinal end on the tail side to the other end on the cockpit side. That is, the moving means that moves the fuselage of the aircraft relatively to the shell moves the circumferential surface of the fuselage from one end on the tail side to the other end on the cockpit side. Thus, when the collapsing is started from the thin rear end, the following collapsing operations, sequentially carried out successively, can be achieved smoothly. Further, as described above, the pressure bulkhead has a bowl shape opened to the cabin. The pressing is started from the rear end. Accordingly, the side wall portion of the bowl, instead of the edge of the bowl, can be pressed for easier collapsing.

The wedge pressing member in the first collapsing step of the present invention may include any that is capable of inwardly deforming and cutting the annular frames of the aircraft fuselage together with the skin and stringers. The wedge-shaped abut portion for the annular frames may be any that has a size to inwardly deform and cut the annular frames together with the skin and stringers by the pressing by the wedge pressing member. Preferably, the abut portion has a plate-shaped portion of (30 to 50 cm)×(60 to 100 cm). When the size is smaller than the preferable one, the annular frames are not cut or inwardly deformed rapidly. When the size is larger than the preferable one, a great pressing force may be needed to deform the annular frames.

The wedge pressing member of the present invention is preferably equipped with auxiliary pressing members on its both sides to prevent a buildup of the fuselage when the wedge pressing member presses the fuselage. As a result, the wedge pressing member is prevented from entering the fuselage too much carelessly to achieve a preferable collapsed state. As the auxiliary pressing members, plate-shaped members projecting sideward from the wedge pressing member are disclosed in the after-mentioned example. The similar auxiliary pressing members may be placed to both sides of the wedge pressing member to be driven after the wedge pressing member is driven.

The simultaneous pressing toward the fuselage from two directions crossing the pressing direction of the wedge pressing member at the fuselage center in the second collapsing step of the present invention may be achieved by a pair of pressing members. For example, when the wedge-shaped pressing member presses the fuselage from above, a pair of pressing members is placed in the direction of both sidewalls of the fuselage for the compression by the pressing members toward the center of the fuselage. The wedge pressing member and the pair of pressing members are preferably hydraulically driven to form a waste mass by a large pressure.

When the wedge pressing member of the present invention abuts each of the juxtaposed annular frames of the fuselage, each annular frame is pressed substantially equally. That is, the annular frames are juxtaposed at an interval of 20 inches (=50.8 cm). The fuselage is thin in the rear end, becomes thicker gradually, and becomes thin in the front end on the cockpit side. The rear adjacent annular frames are different from each other in size. The front adjacent annular frames are different from each other in size. For this reason, the wedge pressing member is tilted for substantially equal pressing between the adjacent frames. For example, the front and rear positions of the wedge pressing member are coupled to hydraulic pistons, whose pressures may be each controlled when the wedge pressing member abuts the frame to be pressed. When the middle position of the wedge pressing member is coupled to a hydraulic piston, the wedge pressing member is axially supported to tilt forward and rearward. The tilting can be made for the substantially equal pressing.

Preferably, the wedge pressing member of the present invention presses the annular frames of the fuselage obliquely to their circumferences. Thus, when the fuselage is pressed from two directions simultaneously in the following second collapsing step, the annular frame is deformed obliquely and becomes deformable by a small collapsing force to have a small diameter. In detail, for example, when the wedge pressing member presses the circumference of the annular frame vertically, deformation or cutting toward the center of the fuselage of the frame is made vertically to the circumferential direction of the frame. Therefore, when the fuselage is pressed from two directions simultaneously in the following second collapsing step, the deformed or cut surfaces abut one another. Thus, the collapsing may need a greater force.

On the other hand, when the wedge pressing member presses the annular frame of the fuselage obliquely to its circumferential direction, the deformation or cut toward the center of the fuselage of the frame is made obliquely to the circumferential direction of the frame. Therefore, when the fuselage is pressed from two directions simultaneously in the following second collapsing step, the collapse is made such that the deformed or cut surfaces pass by one another obliquely. Accordingly, the annular frame is deformed obliquely to have a smaller diameter even by a small collapsing force. Particularly, as described above, since the annular frames are juxtaposed at an interval of twenty inches (=50.8 cm), the obliquely collapsed frame is deformed to enter between the frames adjacent thereto spirally. The frames are easily subject to collapsing as if a dust cloth is wrung.

The aircraft dismantling method of the invention is to dismantle aircrafts, and includes: a cutting-off step to separate horizontal wings and a vertical wing from the fuselage of the aircraft body; a collapsing step to sequentially collapse the circumferential surface of the fuselage from which the wings have been separated from one longitudinal end to the other end; and a cutting step to cut a collapsed object compressed by the collapsing step by a certain longitudinal length to form a waste mass. The collapsing step includes: a first collapsing step to press at least one portion of the circumference of at least one of the annular frames juxtaposed in the longitudinal direction of the fuselage; and a second collapsing step to press the fuselage from two directions crossing the pressing direction of the wedge-shaped pressing member at the center of the fuselage simultaneously after the first collapsing step. Auxiliary pressing members that are capable of preventing a buildup of the fuselage when the wedge-shaped pressing member presses the fuselage are provided to both sides of the wedge-shaped pressing member. Thus, aircrafts are allowed to be reused as effective resources and to be dismantled rapidly.

The fuselage pressed in first collapsing step by the wedge pressing member and in the second collapsing step by the pair of sidewall pressing members is preferably subject to a successive collapsing step that further collapse and compress the portion compressed in the collapsing steps toward the center of the fuselage between the compressing step and cutting step of the present invention. This is because large aircrafts such as the Boing 747 may need to be collapsed further small. For example, the cross section is collapsed to a rectangular shape by a downward hydraulic ram that crushes the fuselage whose diameter has been reduced in the collapsing step from above and a side pressing ram that presses the fuselage orthogonally to the crushing direction of the downward hydraulic ram, and then may be subject to the cutting step.

With respect to the side pressing ram, the collapsing for diameter reduction is achieved by the pressing from one side to the other side by use of one ram. Since a large aircraft is long, the fuselage may be bended to a shape of an angle bracket along the longitudinal direction. For this reason, preferably, a pair of side pressing rams is placed to the both sides to sandwich the longitudinal axis and to press the aircraft by an equal pressure. Instead of pressing for diameter reduction at one time, it is preferable that the diameter is gradually reduced through multiple steps as in the successive collapsing step in which compression is made sequentially through multiple steps.

The waste mass obtained by the collapsing is shredded finely into fragments, which are sorted into metal such as iron, aluminum, and duralumin and plastic pieces to be used as resources. The shredding may be made by a shredder. Specifically, the waste mass is shredded into coarse fragments by a coarse shredder, and then the obtained coarse fragments are further shredded finely by a main shredder.

EXAMPLES

Figure 2A:
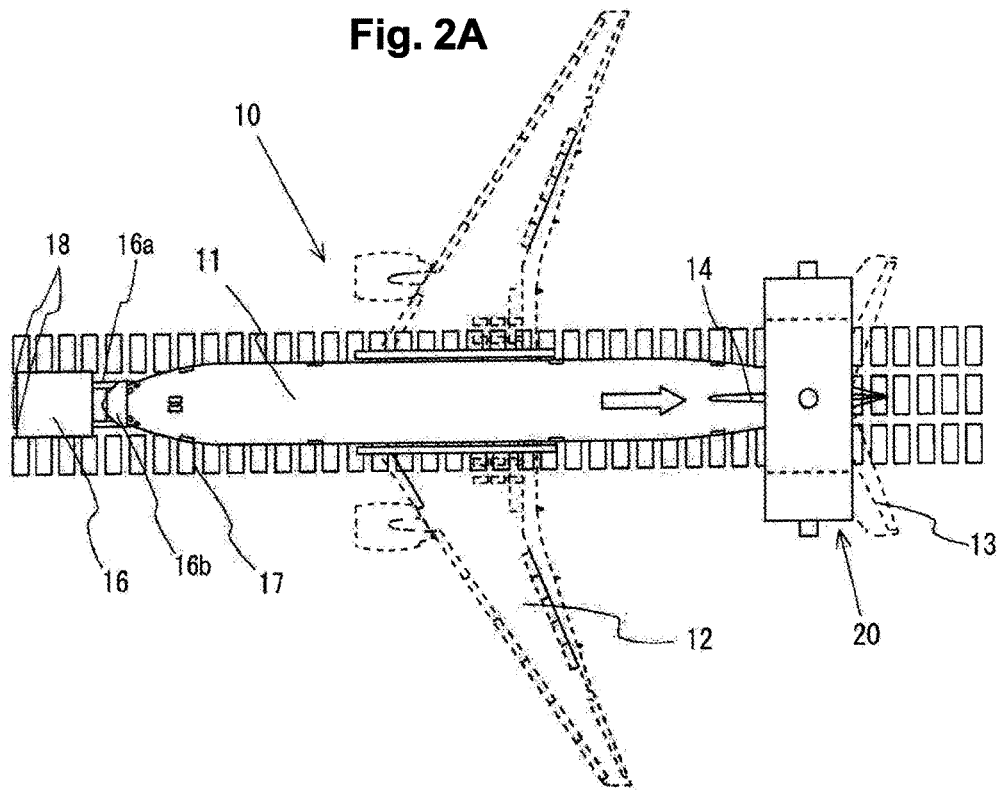
FIGS. 2A, 2B, and 2C are schematic views explaining the overview of the dismantling step including an aircraft collapsing device.
Figure 2B:
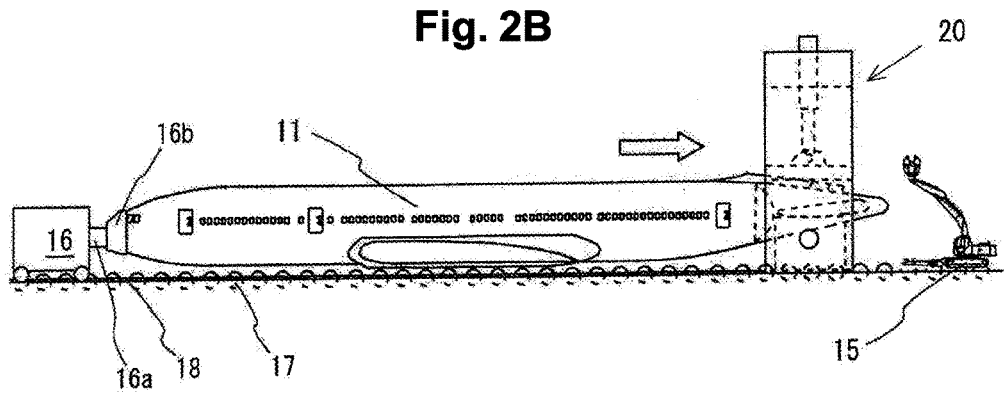
Figure 2C:
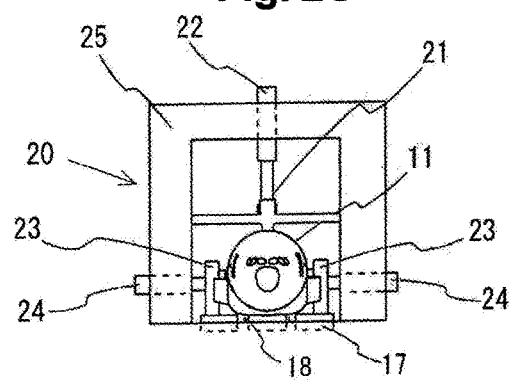
Figure 3:
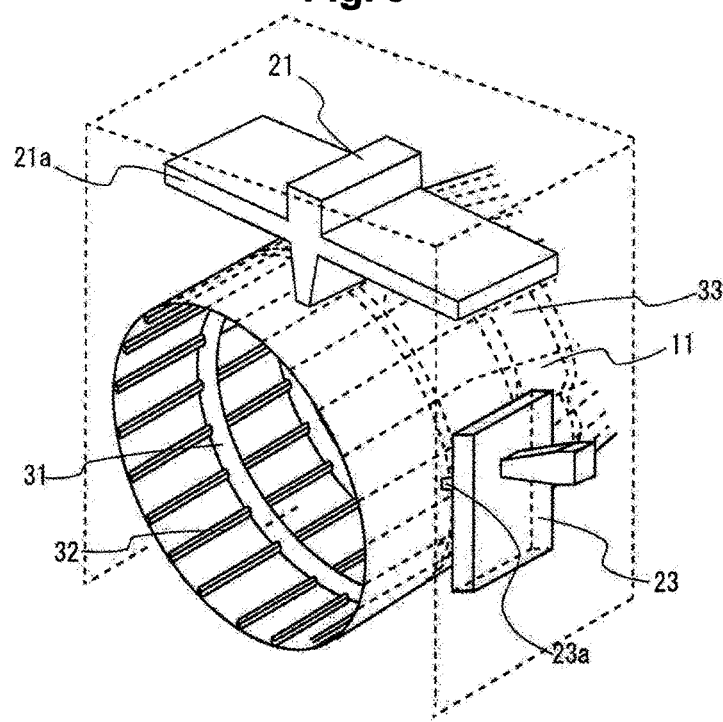
FIG. 3 is an schematic view explaining the structure of a fuselage of an aircraft.
Figure 5:
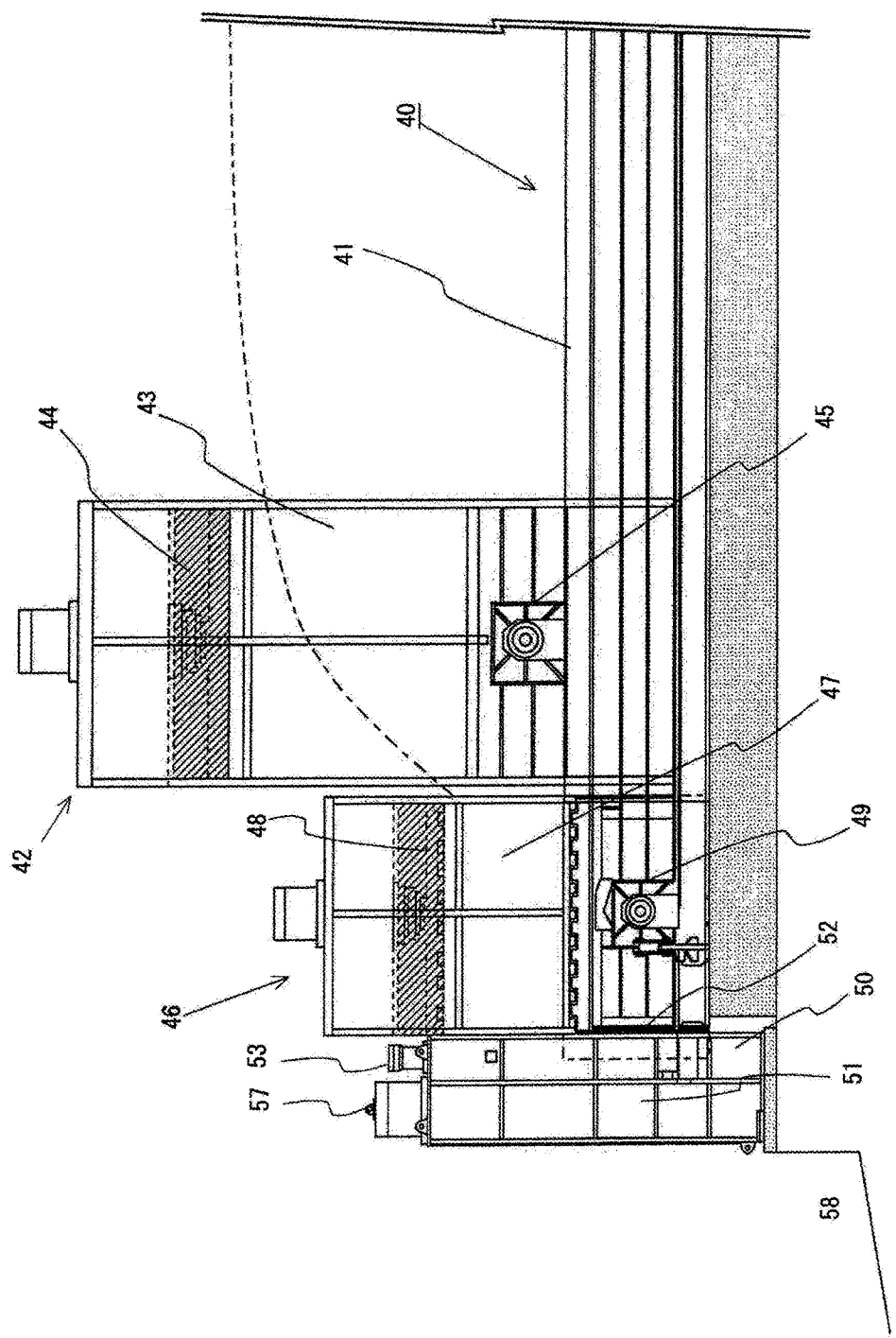
FIG. 5 is an schematic view explaining a plane structure of a shearing device provided with successive collapsing means.
Figure 6A:
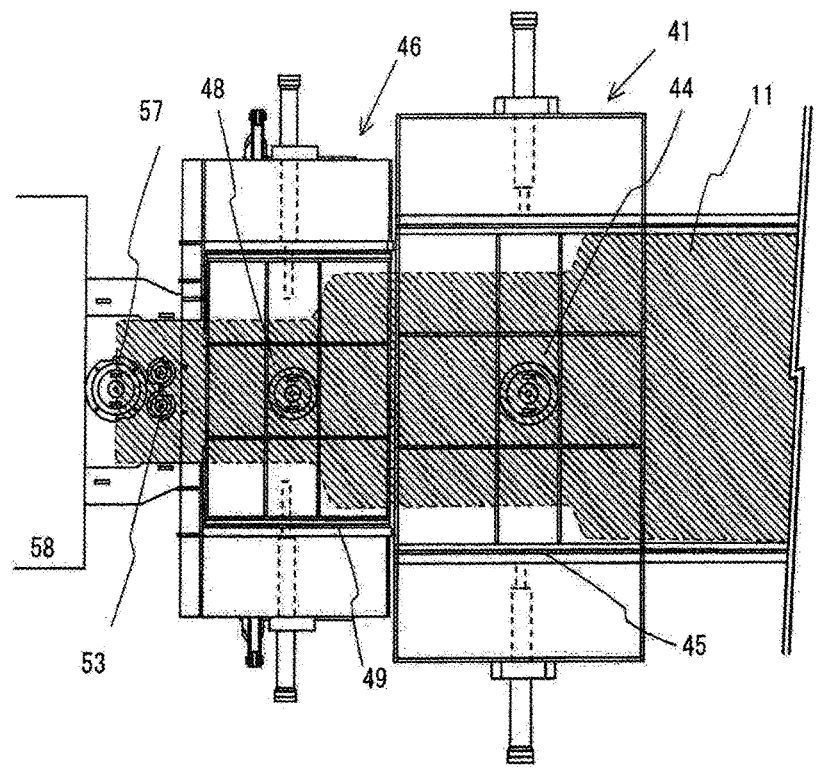
FIG. 6A is a schematic plan view showing operation of the shearing device of FIG. 5 immediately after shearing.
Figure 6B:
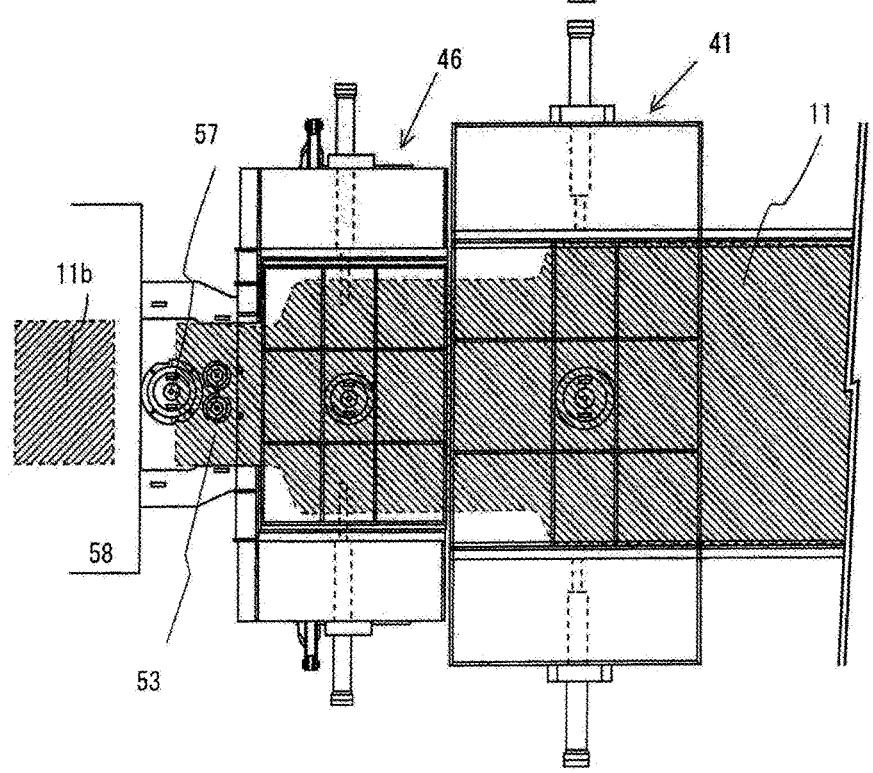
FIG. 6B is a schematic plan view showing operation of the shearing device of FIG. 5 after downward compression and a side compressing step.
Figure 7:
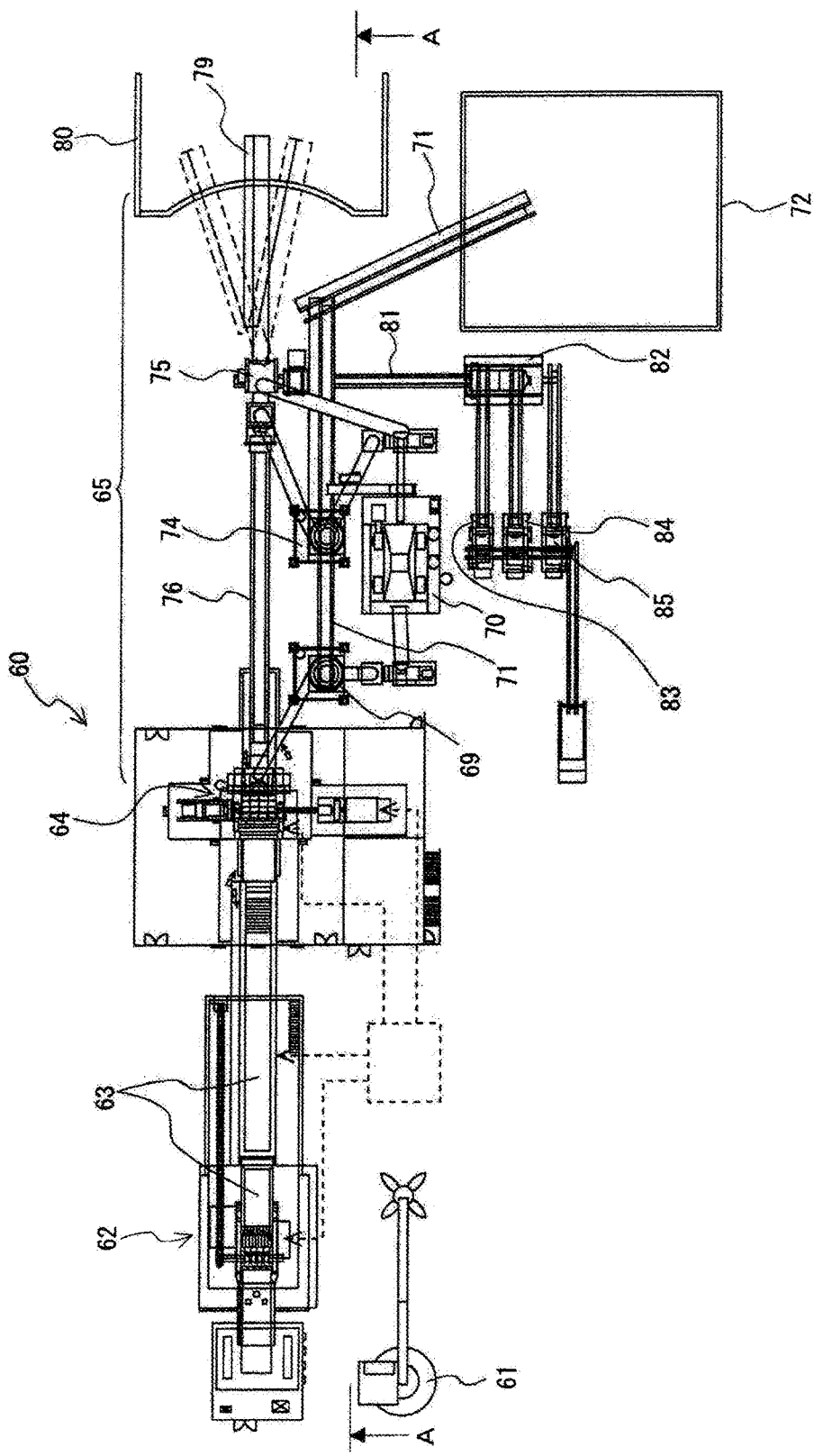
FIG. 7 is a plan view showing the overall structure of a scrap shredding-sorting facility.

FIG. 1 is a flowchart of one example of the present invention to show the dismantlement of an aircraft. FIGS. 2A, 2B, and 2C are schematic views explaining the overview of the dismantling step including an aircraft collapsing device. FIG. 3 is an schematic view explaining the structure of a fuselage of an aircraft. FIGS. 4A, 4B, 4C, and 4D are schematic views of a collapsing step. FIG. 5 is an schematic view explaining a plane structure of a shearing device provided with successive collapsing means to perform a cutting step after a successive collapsing step. FIG. 6A is a schematic plan view showing operation of the shearing device of FIG. 5 just after shearing. FIG. 6B is a schematic plan view showing operation of the shearing device of FIG. 5 after downward compression and a side compressing step. FIG. 7 is a plan view showing the overall structure of a scrap shredding-sorting facility. FIG. 8 is a sectional view taken along line A-A of FIG. 7.

As shown in FIG. 1, a method of dismantling an aircraft, it is first the step (S1) of loading the yard to be dismantled into a dismantlement yard. When the dismantlement yard is established near a runway of an airport, the transportation on roads by use of transportation means such as a truck is not necessary. The transported aircraft is subject to the step (S2) of removing its internal components. The internal components include recyclable devices of the cockpit, seats for crews and passengers, and windows. Engines and tires outside the aircraft, fuel, etc. may be removed and discharged therefrom at this stage when they are not removed at the time of the transportation. Hydraulic pressure gauges for driving flaps of the wings etc. are removed and hydraulic fluid for hydraulic pressure is discharged. Depleted uranium is removed from an aircraft having depleted uranium at this stage, and may be managed properly.

As shown in FIGS. 2A, 2B, and 2C, the dismantlement begins from a step (S3) of separating to cut off main wings 12, horizontal wings 13, and a vertical wing 14 from a fuselage 11 of an aircraft body 10. Since the fuel tank is mounted to the main wings 12 etc., the cutting-off using a torch may cause fire. The cutting-off may be performed after complete removal of fuel in the fuel tank, or cutting may be performed not to cause a fire due to, e.g., a heavy machine 15 having a strong cutter as shown in FIG. 2.

As shown in FIGS. 2A, 2B, and 2C, the fuselage 11 of the aircraft, from which the wings have been cut off, is mounted on many rollers 17 established in three lines in the same direction, and moved toward a collapsing device 20 by a railcar 16 moving on rails 18 laid between each line with its tail side being first. The rails 18 are laid toward just before the entrance of the collapsing device 20. The fuselage 11 of the aircraft, including its front end, can enter the collapsing device 20 by the railcar 16. The rails 18 are not destroyed by the collapse by the collapsing device 20. Arms 16a are formed to the railcar 16 toward the aircraft. An abutment portion 16b is formed to the top ends of the arms 16a to abut the top end of the fuselage 11 of the aircraft. The drive of the railcar 16 is transmitted to the fuselage 11 properly for the transportation.

The collapsing device 20 may be moved on a stage mounting the aircraft body from the tail side. The aircraft body is lightweight relative to its size. Therefore, as shown in FIGS. 2A, 2B, and 2C, when the collapsing device 20 is fixed, and the aircraft body is moved with its tail side being first, the scale of the device can be made compact. The railcar 16 of FIGS. 2A and 2B may be pushed by a vehicle running between the rollers 17 with tires instead of moving on the rails 18.

The step of collapsing the fuselage 11 is performed by the collapsing device 20 as shown in FIGS. 2A, 2B, and 2C. In detail, when the circumference of the fuselage 11 along longitudinal direction is collapsed from its one longitudinal end to the other end sequentially, a step (S4) of first collapsing is carried out to press at least one portion of the circumference of each the annular frames forming the cross section along the longitudinal direction of the fuselage toward the central longitudinal axis of the cross section of the fuselage by use of a wedge-shaped pressing member. A step (S5) of second collapsing is performed to simultaneously press the fuselage subjected to the step of first collapsing from two directions crossing the pressing direction of the wedge-shaped pressing member at the center of the fuselage. In the collapsing device 20 that performs the collapsing steps, the wings decoupled from a large passenger-carrying aircraft in the cutting step may be collapsed, and may be collapsed together with the fuselage 11 or alone in the after-mentioned successive collapsing step in accordance with their sizes.

As shown in FIG. 2C, the collapsing device 20 includes: a gate-shaped shell 25 formed to cover the circumference of both sides and upper portion of the fuselage 11 of the aircraft body from which the wings have been decoupled; a wedge-shaped pressing member 21 mounted to the upper portion of the shell to press at least one portion of the circumference of at least one of the annular frames juxtaposed longitudinally of the fuselage 11; and a pair of sidewall pressing members 23 mounted to both sides of the shell 25 to press the fuselage from two directions crossing the pressing direction of the wedge-shaped pressing member 21 at the center of the fuselage after the pressing by the wedge-shaped pressing member 21. The wedge-shaped pressing member 21 is coupled to an upper hydraulic actuator 22 mounted to the upper portion of the shell 25. The pair of sidewall pressing members 23 is coupled to a pair of side actuators 24 mounted to both sides of the shell 25.

As shown in FIG. 3, the fuselage 11 of the aircraft body has a semi-monocoque structure including: multiple juxtaposed annular frames 31; multiple stringers 32 coupling the juxtaposed annular frames to one another; and a skin 33 covering the frames 31 and stringers 32. The wedge-shaped pressing member 21 includes a plate-shaped auxiliary pressing member 21*a* projecting sideward of the wedge-shaped pressing member 21. The auxiliary pressing member 21*a* rises and falls along both sides of the gate-shaped shell 25. Thus, the wedge-shaped pressing member is prevented from enter the fuselage too much carelessly to obtain a preferable collapse state. A projection member 23*a* is formed to the center on the pressing surface of the plate-shaped pressing plate of each of the pair of sidewall pressing members 23 longitudinally of the fuselage 11 as an auxiliary for the wedge-shaped pressing member. The projection member 23*a* first bends and breaks the annular frame 31 for easy deformation.

Figure 4A:
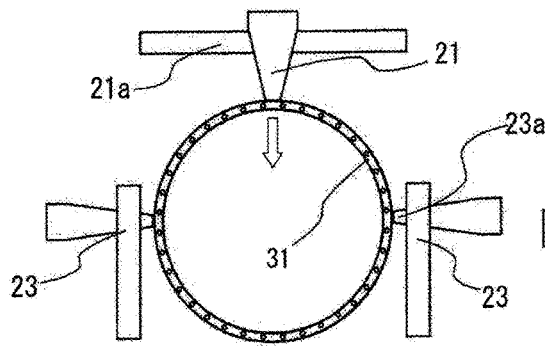
FIGS. 4A, 4B, 4C, and 4D are schematic views of a collapsing step.
Figure 4B:
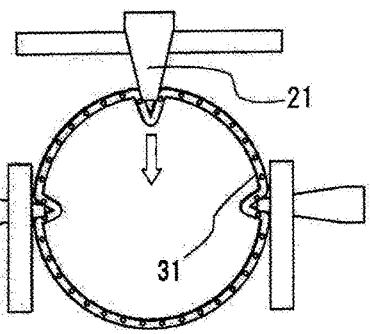
Figure 4C:
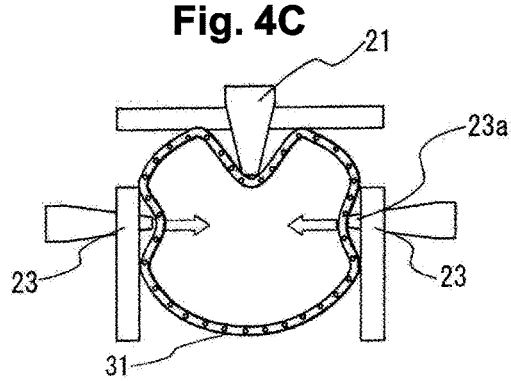
Figure 4D:
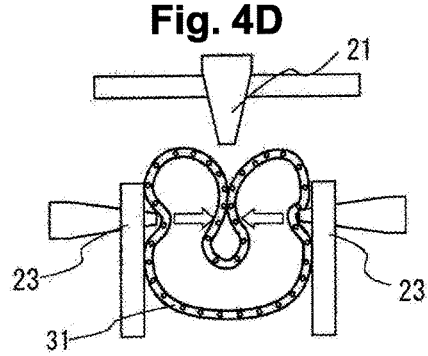

As shown in FIG. 3 and FIG. 4A, the collapsing device 20 presses the circumferential surface of the annular frame 31 externally and presses the annular frame 31 from above by the wedge-shaped pressing member 21. As shown in FIG. 4B, the annular frame 31 pressed by the wedge-shaped pressing member 21 deforms inwardly of the fuselage 11. As shown in FIG. 4C, when the annular frame 31 is further pressed by the wedge-shaped pressing member 21, its pressed portion is bended and broken. In this stage, the sides of the frame 31 are pressed inwardly by the pair of sidewall pressing members 23. As shown in FIG. 4D, after the pressings, the annular frame 31 is foldably deformed having a small diameter.

In this case, the longitudinal axis of the wedge-shaped pressing member 21 and the circumference of the annular frame 31 may be placed not orthogonally to but obliquely to one another. In addition, the projection members 23*a* of the pair of sidewall pressing members 23 may be placed not orthogonally to but obliquely to the circumference of the annular frame 31 in the same oblique direction as the wedge-shaped pressing member 21. When the obliquely broken end of the annular frame 31 in the first collapsing step of the wedge-shaped pressing member 21 is subjected to simultaneous pressing toward the fuselage from two directions in the following collapsing step, the deformed or cut surfaces are collapsed to obliquely pass by one another (specifically, in FIG. 4D, the portions deformed oppositely to one another are collapsed to pass by one another).

In addition, the annular frame 31 is further broken and collapsed to obliquely pass by one another also by the projection members 23*a* of the pair of sidewall pressing members 23. Accordingly, the annular frame is obliquely deformed. As a result, the frame can be deformed having a smaller diameter as if a duster is wrung. The deformed or cut surfaces of the annular frame 31 are collapsed to obliquely pass by one another by the collapsing device 20. Also in the following successive collapsing step, the collapsing is facilitated such that the deformed or cut surfaces of the annular frame 31 further pass by one another obliquely. For this reason, the fuselage 11 of the aircraft body is collapsed to have a smaller diameter.

The wedge-shaped pressing member 21 and the pair of sidewall pressing members 23 may press and collapse the fuselage 11 separately in accordance with a situation, but may be driven together with each other by programming when the successive collapsing is made by the shearing device 40 having the successive collapsing means of FIGS. 5, 6A, and 6B. That is, while the fuselage 11 is pressed by the wedge-shaped pressing member 21 from above, the fuselage 11 is pressed by the pair of sidewall pressing members 23 from both sides to have a small width. In this case, to make the pressing by the pair of side wall pressing member 23 preferable, engagement members etc. may be provided to the plate-shaped auxiliary pressing member 21*a* of the wedge-shaped pressing member 21 to engage the upper surfaces of the pair of side wall pressing members 23. The drive of the wedge-shaped pressing member 21 and of the pair of sidewall pressing members 23 may be controlled such that the height and width after the pressing are smaller than the maximum height and width introduced into the shearing device 40.

The collapsing device 20 and fuselage 11 are moved relative to one another. In the collapsing device 20, the portion to be collapsed is moved from the rear end to cockpit side, and the fuselage 11 is collapsed to have a small diameter. Preferably, since the fuselage 11 is long, it is moved by the railcar 16. An operator may board the railcar 16 to move the aircraft body or the crewless railcar 16 may be operated from a remote place. In this case, the simple system can be constituted by wireless communications between the operator who operates the railcar 16 and the operator who operates the collapsing device 20 and the successive collapsing step mentioned later. The collapsing to achieve a small diameter of the fuselage 11 by the wedge-shaped pressing member 21 and sidewall pressing members 23 may be controlled mechanically while measuring the movement distances of the wedge-shaped pressing member 21 and sidewall pressing members 23 to the center of the fuselage 11.

The fuselage 11 deformed to have a small diameter is subject to a successive collapsing step (S6) to further collapse and compress the portion compressed in the collapsing step toward the center of the fuselage. In this successive collapsing step, the fuselage whose diameter has been reduced in the collapsing step is collapsed to have a rectangular cross section by a downward hydraulic ram that crushes the fuselage from above and a side pressing ram that presses the fuselage orthogonally to the downward direction. Further, the compressed portion of the collapsed fuselage is subject to a cutting step (S7) using a cutting device such as a direct blade shearing device to obtain a waste mass. The collapsing step and successive collapsing step are preferably arranged to be performed successively when the yard has a sufficient space. Even when, after the collapsing step is performed, the successive collapsing step is performed in a different place, no problem arises.

In this example, as shown in FIGS. 5, 6A, and 6B, the successive collapsing step (S6) and cutting step (S7) are performed in the shearing device 40 having the successive collapsing means. In the shearing device 40 of this example, the successive collapsing step (S6) is performed twice, and then the cutting step (S7) is performed. The shearing device 40 includes: an open type feeding channel 41 to form a wide cuboid space; a first successive press machine 42; a second successive press machine 46; and a straight-blade shearing machine 50.

The first successive press machine 42 includes: a hydraulically driven downward hydraulic ram 44 that downwardly crushes the fuselage 11 collapsed by the collapsing device 20 to reduce its height at the upper portion of a first gate-shaped frame 43; and a pair of hydraulically driven side hydraulic rams 45 that crushes the fuselage 11 by the same pressure from both sides to reduce its width. The second successive press machine 46 juxtaposed to the first successive press machine 42 includes: a hydraulically driven downward hydraulic ram 48 that further crushes the fuselage 11 collapsed by the first successive press machine 42 downward to further reduce its height at the upper portion of a second gate-shaped frame 47 smaller than the first gate-shaped frame 43; and a pair of hydraulically driven side hydraulic rams 49 that crushes the fuselage 11 from both sides by the same pressure to further reduce its width.

The downward hydraulic ram 44 of the first successive press machine 42 reduces the height of the fuselage 11 under the inner height of the standby downward hydraulic ram 48 of the second successive press machine 46. The side hydraulic rams 45 reduce the width of the fuselage 11 under the inner width of the standby side hydraulic ram 49 of the second successive press machine 46. The downward hydraulic ram 48 of the second successive press machine 46 reduces the height of the fuselage 11 under the inner height of a shearing opening 52 of the straight-blade shearing machine 50. The side hydraulic rams 49 reduce the width of the fuselage 11 under the inner width of the shearing opening 52 of the straight-blade shearing machine 50.

The straight-blade shearing machine 50 has a passage formed in a gate-shaped frame 51 for airframes. The entrance of this passage forms the shearing opening 52 that is opened to one end surface with which a feed channel 41 communicates through the first successive press machine 42 and the second successive press machine 46. An exit opposite thereto is opened to a pit 58 to receive sheared short waste masses. In the middle of this passage, a hydraulic stamper (not shown) driven by a hydraulic cylinder 53 to downwardly suppress and clamp the fuselage 11 compressed before the cutter at the time of shearing, a lower cutter blade (not shown) adjacent this hydraulic stamper and has been secured to the exit side, an upper cutter blade (not shown) that shears the compressed fuselage 11 into waste masses in cooperation with the lower cutter blade, and a main hydraulic cylinder 57 that drives this upper cutter blade.

Drive systems for the straight-blade shearing machine 50, pair of side hydraulic rams 49 and downward hydraulic ram 48 of the second successive press machine 46, and pair of side hydraulic rams 45 and downward hydraulic ram 44 of the first successive press machine 42 control them in a predetermined operation order. That is, this shearing device shears, into multiple short waste masses 11b, the aircraft fuselage 11 having the semi-monocoque structure including the multiple juxtaposed annular frames, the multiple stringers coupling the adjacent frames to each other, and the skin that covers the frames and stringers.

The waste masses 11b sheared by the straight-blade shearing machine 50 fall into the pit 58 provided adjacent the exit of the straight-blade shearing machine 50, and stored temporarily. The bottom surface of the pit 58 is placed lower than the lower cutter blade of the straight-blade shearing machine 50, and tilts to be gradually deeper away from the shearing machine. Therefore, the sheared waste masses move by themselves away from the portion nearest to the straight-blade shearing machine 50 in the pit 58, and thus do not stay near the exit of the straight-blade shearing machine.

The feed channel 41 is completely opened upward except in the area where the downward hydraulic ram 44 is placed. When the downward hydraulic ram is in the rising position (initial position), its lower space is also opened. The downward hydraulic ram 45 is driven by a hydraulic cylinder. These components form the downward hydraulic press machine 50. The downward hydraulic ram 44 and the hydraulic cylinder are supported by the gate-shaped frame 43 placed across both sidewalls of the feed channel 41. The downward hydraulic ram 44 has the same width as the inner width of the feed channel 41. Each side hydraulic ram 45 forms one of the inner wall surfaces over a certain limited area of the feed channel 41 toward the shearing mouth, and is driven by a side hydraulic cylinder for the pressing drive from the side thereof. These side hydraulic rams 45 and hydraulic cylinders form the side press machine 42.

The obtained waste masses 11b contain mixed various materials such as ferrous metals, aluminum metals, and nonmetals. Therefore, the masses are sorted in a shredding step (S8) that shreds the masses and in a sorting step (S9) that sorts fragments shredded in the shredding step by density or material. The shredding step (S8) and the sorting step (S9) are explained in detail. The shredding step (S8) and the sorting step (S9) are performed using a scrap crushing-sorting device 60 shown in FIGS. 7 and 8. The scrap shredding-sorting device 60 mainly includes a coarse shredder 62, a main shredder 64, and a sorter 65. The shredding step of this embodiment is divided into two steps by use of the coarse shredder 62 that shreds waste masses into coarse fragments and the main shredder 64 that shreds the coarse fragments finer.

The coarse shredder 62 into which the waste masses have been introduced by a stationary crane device 61 rotates multiple axially rotating blades having different rotation speeds to tear and shred the waste masses. The coarse shredder 62 detects a load torque based on a detection signal depending on sizes and density of the introduced waste masses by use of a rotation detection sensor and a current detection sensor associated with a driving motor of the shredder 62, and increases and decreases driving current in response to the detected load torque to shred the waste masses automatically. The shredded coarse fragments are discharged from the coarse shredder 62, and transported to the main shredder 64 by a transportation conveyer 63.

The main shredder 64 is the so-called a hammer shredder that rotates a rotation drum 66 having multiple hammer-shaped blades on its circumference to hammer and shred coarse debris finely and to form fragments. The main shredder 64 detects a load torque based on a detection signal depending on the size or density of introduced coarse fragments by use of a rotation detection sensor and a current detection sensor associated with its driving motor, and increases and decreases a driving current in response to the detected load torque to shred the coarse fragments automatically.

Thus, fragments are obtained from the waste masses by the coarse shredder 62 and the main shredder 64, and then the shredding step (S8) is completed. It is not necessary to perform the successive collapsing step to obtain the waste masses 11b and the shredding step to obtain the fragments from the waste masses in the same yard. The waste masses 11b may be transported to a yard for the shredding step and the following sorting step by, e.g., a truck.

The step next the shredding step (S8) is the sorting step (S9) to sort the fragments in accordance with the density and material. In the sorting step, the fragments are sorted into ferrous metal, non-ferrous metal, and fragments mainly including plastic in accordance with density or material of the fragments by use of the sorter 65. The sorter 65 includes a vibrating feeder 67 for sorting based on density, a first cyclone device 69 and a second cyclone device 74, and a drum type magnetic separator 75 for sorting based on material.

First, the debris finely shredded by the main shredder 64 is screened by the vibrating feeder 67 into metal fragments having high density and plastic fragments mainly including plastic with low density. The fragments having low density spatter by vibration of the vibrating feeder 67, are attracted from a first suction opening 68 placed above the vibrating feeder 67, and transported to the first cyclone device 69.

The fragments having low density are further sorted into light fragments and heavy fragments by the first cyclone device 69. Dust is removed from the light fragments by a wet scrubber 70, which is a scrubbing dust collection device, and ejected to the atmospheric air. The heavy fragments separated in the first cyclone device 69 are transported by a dust transportation belt conveyer 71 and collected in a dust yard in a dust chamber 72.

The metal fragments transported on the vibrating feeder 67 are introduced to the drum type magnetic separator 75 by a transportation belt conveyer 76. The drum type magnetic separator 75 sorts the metal fragments into ferrous metal and non-ferrous metal by magnetism while the metal fragments fall from a height. During the falling, wind blows upward. The light fragments having light density that have escaped at the time of sorting by the vibrating feeder 67 are attracted from a second suction opening 73 placed above the drum type magnetic separator 75 and sorted.

The light fragments having high density attracted by the second suction opening 73 are further sorted by the second cyclone system 74 into light fragments having low density and heavy fragments having high density. As described above, dust is removed from the light fragments by the wet scrubber 70 and discharged to the atmospheric air. The heavy fragments separated by the second cyclone device 74 are transported by the dust transportation belt conveyer 71 etc. as plastic fragments, and collected in a dust yard in the dust chamber 72.

The metal fragments that have escaped from the drum type magnetic separator 75 are transported by the vibrating conveyer 77 mounted below the drum type magnetic separator 75 while being vibrated. The ferrous metal fragments are removed by a suspension type magnetic separator 78 mounted in the middle of the transportation. The removed ferrous metal fragments are joined to the ferrous metal fragments sorted by the drum type magnetic separator 75, and collected in a ferrous-product yard 80 by an iron transportation swivel belt conveyer 79.

The non-ferrous metal fragments not attracted by the two magnetic separators 75, 78 by magnetism are sorted into three types of particle size by a trommel 82, which is a particle size sorter, while being transported by a non-ferrous metal transportation belt conveyer 81. That is, the non-ferrous materials not attracted by the magnetic separators 75 and 78 are sorted into three types by the rotation drum trommel 82, the three types being for plenty of glass and china, plenty of aluminum, and many combustibles. This trommel 82 has a cylindrical "screen" having holes of two sizes. The trommel 82 sorts non-ferrous metal fragments processed by the main shredder 64 by using the fact that glass and china are shredded much finely, combustibles such as wood are shredded into coarse ones, and aluminum is shredded into one having fineness intermediate therebetween.

The non-ferrous metal fragments are "screened" into the fragments including plenty of glass and china through a small hole provided near the entrance to the drum. An area having a large hole is present next to the area where the small hole is provided. The fragments passing through the large hole instead of through the small hole are sorted as fragments including plenty of aluminum. The fragments not passing through the large hole fall from the end portion of the drum without change, and sorted as fragments including many combustibles.

Aluminum in the fragments sorted into three types of particle size is sorted into ferrous fragments, aluminum fragments, and non-ferrous fragments by a magnetic force rotating at high speed. That is, in each of three aluminum sorters 83, 84, and 85 adapted to respective particle sizes, the fragments are approximated to the magnet rotating at high speed, and sorted into aluminum fragments repelling the magnet, metal fragments attracted by the magnet, and non-ferrous fragments not repelling or attracted by the magnet.

Through the above steps, after the waste masses are shredded finely into fragments, the fine fragments are sorted into ferrous fragments, aluminum fragments, and non-ferrous fragments to be highly useful as effective resources. Particularly, aircraft bodies can be sorted into aluminum and duralumin, which is an alloy thereof.

DESCRIPTION OF THE REFERENCE NUMERALS

S1 . . . a step of loading the yard,
S2 . . . a step of removing,

S3 . . . a step of separating,
S4 . . . a step of first collapsing,
S5 . . . a step of second collapsing,
S6 . . . a successive collapsing step,
S7 . . . a cutting step,
S8 . . . a shredding step,
S9 . . . a sorting step,
10 . . . an aircraft body,
11 . . . a fuselage,
11b . . . a waste masse,
12 . . . a main wing,
13 . . . a horizontal wing,
14 . . . a vertical wing,
15 . . . a heavy machine,
16 . . . a railcar,
17 . . . a roller,
18 . . . a rail,
20 . . . a collapsing device,
21 . . . a wedge-shaped pressing member,
21a . . . a plate-shaped auxiliary pressing member,
22 . . . an upper hydraulic actuator,
23 . . . a pair of sidewall pressing members,
23a . . . a projection member,
24 . . . a pair of side actuators,
25 . . . a gate-shaped shell,
31 . . . an annular frame,
32 . . . a multiple stringer,
33 . . . a skin,
40 . . . a shearing device,
41 . . . an open type feeding channel,
42 . . . a first successive press machine,
43 . . . a first gate-shaped frame,
44 . . . a hydraulically driven downward hydraulic ram,
45 . . . a pair of hydraulically driven side hydraulic rams,
46 . . . a second successive press machine,
43 . . . a second gate-shaped frame,
48 . . . a second successive press machine,
49 . . . a second gate-shaped frame,
50 . . . a straight-blade shearing machine,
51 . . . a gate-shaped frame,
52 . . . a shearing opening,
53 . . . a hydraulic cylinder,
57 . . . a main hydraulic cylinder,
58 . . . a pit,
60 . . . a scrap shredding-sorting device,
61 . . . a stationary crane device,
62 . . . a coarse shredder,
63 . . . a transportation conveyer,
64 . . . a main shredder,
65 . . . a sorter,
66 . . . a rotation drum,
67 . . . a vibrating feeder,
68 . . . a first suction opening,
69 . . . a first cyclone device,
70 . . . a wet scrubber,
71 . . . a dust transportation belt conveyer,
72 . . . a dust chamber,
73 . . . a second suction opening,
74 . . . a second cyclone device,
75 . . . a drum type magnetic separator,
76 . . . a transportation belt conveyor,
77 . . . a vibrating conveyor,
78 . . . a suspension type magnetic separator,
79 . . . an iron transportation swivel belt conveyor,
80 . . . a ferrous-product yard,
81 . . . a non-ferrous metal transportation belt conveyor,
82 . . . a trommel,
83, 84, 85 . . . a aluminum sorter,

The invention claimed is:

1. An aircraft collapsing device that collapses a fuselage of an aircraft inward, the system comprising:
   a gate-shaped shell formed to cover a circumference of both sides and an upper portion of a fuselage of an aircraft body from which horizontal wings and a vertical wing have been decoupled;
   a wedge-shaped pressing member that is mounted on an upper portion of the shell to press at least one portion of a circumference of at least one of annular frames juxtaposed in a longitudinal direction of the fuselage toward a center of the fuselage;
   a pair of sidewall pressing members that is mounted on both sides of the shell to press the fuselage simultaneously from two directions crossing a pressing direction of the wedge-shaped pressing member at the center of the fuselage after pressing by the wedge-shaped pressing member; and
   a moving unit that moves the fuselage of the aircraft and the shell relative to one another,
   wherein each of the pair of sidewall pressing members includes a plate-shaped pressing plate, and a projection member extends in a longitudinal direction of the fuselage and is formed on the pressing surface side of the plate-shaped pressing plate.

2. The aircraft collapsing device according to claim 1, wherein the moving unit moves a circumferential surface of the fuselage from one longitudinal end on a tail side to an other end on a cockpit side.

3. The aircraft collapsing device according to claim 1, wherein when the wedge-shaped pressing member abuts to each of the juxtaposed annular frames of the fuselage, the wedge-shaped pressing member presses each annular frame substantially equally.

4. The aircraft collapsing device according to claim 1, wherein the wedge-shaped pressing member presses the at least one of annular frames of the fuselage obliquely to a circumferential direction of the at least one of annular frames.

5. The aircraft collapsing device according to claim 1, wherein auxiliary pressing members that are capable of preventing a buildup of the fuselage when the wedge-shaped pressing member presses the fuselage are provided on both sides of the wedge-shaped pressing member.

6. The aircraft collapsing device according to claim 2, wherein when the wedge-shaped pressing member abuts to each of the juxtaposed annular frames of the fuselage, the wedge-shaped pressing member substantially presses each annular frame equally.

7. The aircraft collapsing device according to claim 2, wherein the wedge-shaped pressing member presses the at least one of annular frames of the fuselage obliquely to a circumferential direction of the at least one of annular frames.

8. The aircraft collapsing device according to claim 3, wherein the wedge-shaped pressing member presses the annular frames of the fuselage obliquely to a circumferential direction of the annular frames.

9. The aircraft collapsing device according to claim 6, wherein the wedge-shaped pressing member presses the annular frames of the fuselage obliquely to a circumferential direction of the annular frames.

10. The aircraft collapsing device according to claim 2, wherein auxiliary pressing members that are capable of preventing a buildup of the fuselage when the wedge-shaped pressing member presses the fuselage are provided on both sides of the wedge-shaped pressing member.

11. The aircraft collapsing device according to claim 3, wherein auxiliary pressing members that are capable of preventing a buildup of the fuselage when the wedge-shaped pressing member presses the fuselage are provided on both sides of the wedge-shaped pressing member.

12. The aircraft collapsing device according to claim 4, wherein auxiliary pressing members that are capable of preventing a buildup of the fuselage when the wedge-shaped pressing member presses the fuselage are provided on both sides of the wedge-shaped pressing member.

13. The aircraft collapsing device according to claim 6, wherein auxiliary pressing members that are capable of preventing a buildup of the fuselage when the wedge-shaped pressing member presses the fuselage are provided on both sides of the wedge-shaped pressing member.

14. The aircraft collapsing device according to claim 7, wherein auxiliary pressing members that are capable of preventing a buildup of the fuselage when the wedge-shaped pressing member presses the fuselage are provided on both sides of the wedge-shaped pressing member.

15. The aircraft collapsing device according to claim 8, wherein auxiliary pressing members that are capable of preventing a buildup of the fuselage when the wedge-shaped pressing member presses the fuselage are provided on both sides of the wedge-shaped pressing member.

16. The aircraft collapsing device according to claim 9, wherein auxiliary pressing members that are capable of preventing a buildup of the fuselage when the wedge-shaped pressing member presses the fuselage are provided on both sides of the wedge-shaped pressing member.

17. An aircraft collapsing device that collapses a fuselage of an aircraft inward, the device comprising:
 a shell that covers the fuselage;
 a first pressing member that is mounted on the shell and that presses the fuselage in a first pressing direction so as to collapse the fuselage inward; and
 a second pressing member that is mounted on the shell and that presses the fuselage in a second pressing direction crossing the first pressing direction so as to collapse the fuselage inward,
 wherein the second pressing member includes a plate-shaped pressing plate and a projection member that is formed on a pressing side of the plate-shaped pressing plate.

18. The aircraft collapsing device according to claim 17, wherein the first pressing member includes a projecting member and an auxiliary pressing member that is adjusted to prevent the fuselage from buildup and that is provided on a side of the projecting member.

19. The aircraft collapsing device according to claim 17, comprising a plurality of the second pressing members that press the fuselage in directions opposite to each other.

20. The aircraft collapsing device according to claim 19, comprising a control unit that drives the first pressing member prior to the plurality of second pressing members.

\* \* \* \* \*